United States Patent [19]

Robertson et al.

[11] Patent Number: 4,776,655
[45] Date of Patent: Oct. 11, 1988

[54] SINGLE MODE OPTICAL WAVEGUIDES OF RECTANGULAR CROSS-SECTION

[75] Inventors: Michael J. Robertson; Michael J. Adams, both of Ipswich, England

[73] Assignee: British Telecommunications, London, England

[21] Appl. No.: 904,280

[22] Filed: Sep. 8, 1986

[30] Foreign Application Priority Data

Sep. 13, 1985 [GB] United Kingdom ............... 8522704

[51] Int. Cl.$^4$ .................................................. G02B 6/10
[52] U.S. Cl. .................................. 350/96.12; 350/96.17
[58] Field of Search ............... 350/96.12, 96.17, 96.15

[56] References Cited

U.S. PATENT DOCUMENTS

| 3,659,916 | 5/1972 | Marcatili | 350/96.12 |
| 3,947,087 | 3/1976 | Furuta et al. | 350/96.12 |
| 4,375,312 | 3/1983 | Tangonan | 350/96.12 |
| 4,606,602 | 8/1986 | Unger et al. | 350/96.12 |

FOREIGN PATENT DOCUMENTS

0076187 4/1983 European Pat. Off.
924994 3/1955 Fed. Rep. of Germany.

OTHER PUBLICATIONS

Leonberger et al., "Low-Loss GaAs p+n−n+ Three-Dimensional Optical Waveguides", *Applied Physics Letters*, vol. 28, No. 10, May 1976, pp. 616–619.
Noda et al., "A Novel Optical Waveguide for Integrated Optics", 1973 *IEEE OSA Conference on Laser Engineering and Applications*, Digest of Technical Papers, May 1973.
Bell Systems Technical Journal, vol. 53, No. 4, Apr. 4, 1974; U.S.A. "Slab-coupled Waveguides" E. A. J. Marcatili.

Primary Examiner—John Lee
Attorney, Agent, or Firm—Nixon & Vanderhye

[57] ABSTRACT

An optical waveguide device, suitable for coupling to optical fibers, provides a combination of narrow optical confinement and small changes in refractive index along a first axis, with broad optical confinement and large changes in refractive index along a second, perpendicular axis. A rib waveguide in which a single transverse mode beam can propagate, comprises a thin guiding layer 2 sandwiched between a pair of relatively thick confining layers 1, 3 of refractive index only slightly less than that of the guiding layer 2. The rib is etched through both the upper confining layer 3 and the guiding layer 2 and is exposed at its sides and top to air.

9 Claims, 1 Drawing Sheet

SINGLE MODE OPTICAL WAVEGUIDES OF RECTANGULAR CROSS-SECTION

The present invention relates to optical waveguide devices for use in optical communications systems.

Optical waveguides are used in optical communications both in waveguide devices, such as directional coupler switches, phase modulators and interferometric amplitude modulators, and in optical fibres.

An optical waveguide in general comprises a structure having a guiding zone, a confining zone or zones around the guiding zone, and a port for coupling electromagnetic radiation to the guiding zone. The guiding zone has a higher average refractive index than that of the confining zone or zones and, in use, radiation coupled at the port travels along the guiding zone.

It is preferable that signal losses are kept as low as possible in an optical communications system and it is important in the design of a waveguide device for use in such a system firstly that propagation losses within the device are low and secondly that coupling losses between it and adjacent components are low. Waveguide devices have been developed whose propagation losses are as low as 0.1 dB/cm but problems have arisen in achieving low coupling losses. In particular problems have arisen where a waveguide device is to be coupled to an optical fibre.

In order to achieve low coupling losses between two waveguides, the distribution of electromagnetic radiation at the ports of each should be roughly equivalent. It has proved extremely difficult however to manufacture waveguide devices in which the distribution of electromagnetic radiation is roughly equivalent to that of the optical fibres commonly in use today.

In an optical fibre the usual arrangement is that the guiding and confinement zones are produced by changes in refractive index which are distributed in a circularly symmetric or elliptical manner in the cross-section of the fibre. The majority of optical fibre now used in telecommunication systems, particularly in long distance systems, is monomode which has a core of higher refractive index of the order of 15$\mu$m or less wide, and a cladding of lower refractive index whose outer diameter is of the order of 125$\mu$m. These fibres are used to transmit radiation of wavelength in the range 0.8 to 1.65$\mu$m, the radiation propagating along the fibre in a single transverse mode. The beam spot generally has dimensions in the range 5 to 15$\mu$m and the cross-section of the beam is circularly symmetric or elliptical as a result of the distribution of refractive index changes in the fibre.

(It should be noted that where beam or beam spot dimensions are given in this specification, they refer to the full width to the 1/e points of the radiation distribution in the beam or beam spot.)

A waveguide device, unlike an optical fibre, is generally based on a slab of material in which changes in refractive index are more easily produced along flat interfaces than in curved distributions. For instance a semiconductor waveguide device may be manufactured in the form of epitaxially grown layers of material on a substrate. Changes in refractive index can then be produced in each of two perpendicular directions. Firstly, changes can be produced at the interfaces between the layers of material by using materials of different refractive indices. Secondly, changes in the perpendicular direction can be produced by making steps in the layers of material, for instance by etching using a mask. The steps may then either be left exposed to air, which has a low refractive index compared to semiconductor material, or buried in suitable material of preselected refractive index.

A simple form of waveguide device, a semiconductor rib waveguide, may comprise a substrate onto which are grown, epitaxially, three consecutive layers of material: two confining layers separated by a guiding layer, the refractive index of the guiding layer being greater than those of the confining layers. In a secondary role to that of producing a confinement zone, the lower confining layer prevents absorption of propagating radiation by the substrate and the upper confining layer prevents absorption by any metal contact layer which may be applied to the top of the device. Material is removed from at least part of the thickness of the upper confining layer, and may also be removed from at least part of the thickness of the guiding layer, to produce an upstanding rib. The guiding zone then comprises the guiding layer in the region of the rib and adjacent regions of the confining layers. Confinement is provided by the refractive index differences between the guiding layer and the confining layers and, perpendicularly to that, by the refractive index changes at the sides of the rib.

Suitable materials out of which such a semiconductor waveguide device may be constructed include the III-V semiconductor materials and may comprise gallium arsenide and gallium aluminium arsenide, or indium phosphide and indium gallium arsenide phosphide. In either of these cases differences in refractive index of the materials can be controlled by known methods such as by varying the proportions of gallium and aluminium present in the materials.

(It should be noted that throughout this specification terms such as "upper" and "lower" which might be taken to imply a particular orientation of an object are used for convenience of description only and should not be taken as a limitation.)

In alternative forms of the rib waveguide device, the rib may be buried in a subsequent growth step or the layers may each be a composite of thinner layers of different refractive indices. The confining layers do not necessarily have the same, or the same average, refractive index as each other.

Waveguide devices may alternatively be constructed out of dielectric materials such as lithium niobate. In this case, the guiding and confinement zones are produced by different techniques but again changes in refractive index occur along substantially flat planes in the device.

By varying the positions of the changes in refractive index, and by varying the values of those changes, the nature of the beam which will propagate in the device can be controlled. In the semiconductor rib waveguide described above, the dimensions of the rib, and the materials selected for the different layers, can be varied so as to control the beam.

In order to achieve a device in which a single transverse mode beam will propagate, it is known to use relatively narrow optical confinement: that is, the positions of changes in refractive index which act to confine radiation to the guiding zones are physically close to each other. This results in a single transverse mode but also a small spot size. It is here that problems arise in coupling the device to an optical fibre. Although it is relatively easy to achieve a beam of a suitably shaped cross-section, it is not easy to achieve it with a large enough spot size for good coupling to the fibres in common use. To achieve a larger spot size it has been proposed to use relatively broad optical confinement, that is, to move the positions of the changes in refractive index further apart. However this moving of the positions may cause the transmission to become multimode. The single mode transmission can be retained by reducing the value of the changes in refractive index but this tends to require such small changes that the mass production of the device becomes impractical.

It is an object of the present invention to provide a single mode waveguide device for use in optical communications systems which can be designed to have a large spot size but is easier to manufacture than devices of the past.

According to a first aspect of the present invention, there is provided a single mode waveguide device, for coupling optical radiation to a single mode optical fibre, comprising a guiding zone determined in each of two perpendicular directions by a region of higher refractive index bounded on each side by regions of lower refractive index, wherein in a first of the directions the changes in refractive index are large and provide broad optical confinement, and in a second of the directions the changes in refractive index are small and provide narrow optical confinement, the regions of lower refractive index extending far enough away from the regions of higher refractive index that radiation propagating in the device in use does not leak significantly beyond the regions of lower refractive index, the arrangment being such that the beam spot of the waveguide device is at least substantially elliptical.

A large change in refractive index in this context may mean for instance of at least 0.02, and a small change in refractive index in this context may mean for instance in the range 0.0001 to 0.01 inclusive.

Broad optical confinement in this context may mean that the changes in refractive index are separated by a distance which lies in the range from $(0.8w_1-2)$ to $2.3w_1$ inclusive, $w_1$ being the average of the values for the width of the beam spot of the device in each of the two directions, while narrow optical confinement in this context may mean that the changes in refractive index are separated by a distance of not more than $w_1$. For coupling the device to an optical fibre, $w_1$ may typically be required to lie in the range from 5 to 15$\mu$m inclusive.

According to a second aspect of the present invention there is provided a single mode waveguide device, for coupling to an optical waveguide of substantially circular, or other elliptical, beam spot size $W_o$, comprising a guiding zone and a confining zone, the guiding zone being provided by first and second pairs of parallel planar interfaces, the planes in which the interfaces lie together defining a region of material of rectangular cross-section, the first pair of interfaces being provided by the faces of a primary layer of material of thickness T and refractive index $n_1$ sandwiched between upper and lower secondary layers of material of average refractive indices $n_2$ and $n_4$, and the second pair of interfaces being provided at least partially by the sides of a region of the upper secondary layer of width t positioned between two regions of material of refractive index $n_3$, wherein the following constraints apply:

(i) $(n_1-n_3)$ is greater than or equal to 0.02;
(ii) $(n_1-n_4)$ and $(n_1-n_2)$ each lie in the range 0.01 to 0.0001 inclusive;
(iii) T is less than or equal to $W_o$;
(iv) t lies in the range to $(0.8W_o-2)$ to $2.3W_o$ inclusive; and
(v) the thickness of the secondary layers is large enough that radiation does not leak beyond those layers in use of the device;

all measurements being in $\mu$m.

It has been found, surprisingly, that waveguide devices according to the present invention, for coupling to optical fibres of spot sizes lying in the range 5 to 15$\mu$m inclusive, should produce a single transverse mode beam inspite of the fact that optical confinement by means of a very. small change in refractive index is only provided in one of two perpendicular directions instead of in both. Because this is so however, the waveguide devices are easier to manufacture since accurate control over differences in refractive index only has to be exercised regarding two interfaces instead of four as has been done in the past.

Further inspite of the apparently substantial erea asymmetry of the guiding zone, the design is such that the beam spot is roughly circularly symmetrical, or elliptical, matching that of an optical fibre.

The region of the upper secondary layer of width t positioned between two regions of material of refractive index $n_3$ may comprise an upstanding rib formed by opposing steps in the upper secondary layer to either side of which lies the material of refractive index $n_3$. Alternatively, the steps may extend past the upper secondary layer and into the primary layer, optionally extending as far as the lower secondary layer.

Waveguide devices according to the present invention can be manufactured for example out of semiconductor materials by standard production techniques such as metal organic vapour phase epitaxy (MOVPE) growth stages and etching steps.

A rib waveguide device according to an embodiment of the present invention will now be described, by way of example only, with reference to the accompanying figures in which.

Figure 1:
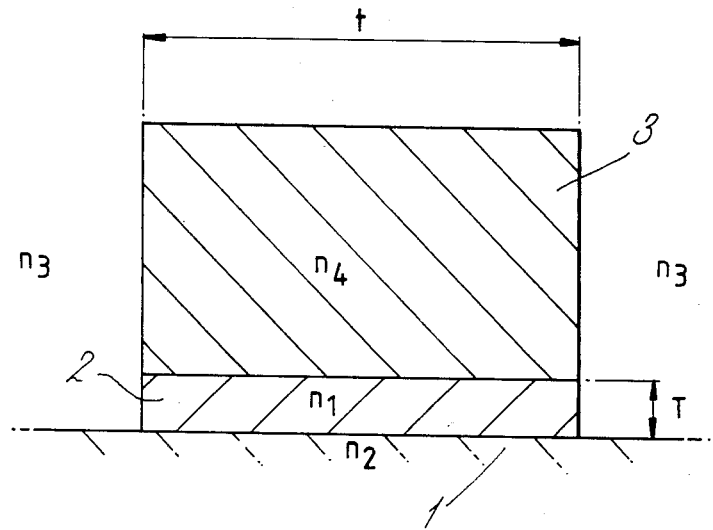
FIG. 1 shows a cross-section of the device.

Referring to FIG. 1, the rib waveguide device comprises a guiding layer 2 sandwiched between two confining or buffer layers 1, 3. The lower buffer layer 1, only a part of which is shown, lies on a substrate (not shown) while the guiding layer 2 and upper buffer layer 3 provide the rib of the device.

The device is designed for use with optical fibres of beam spot size 10$\mu$m, transmitting radiation of wavelength $\lambda$ equal to 1.55$\mu$m, distributed across the beam in a manner which is at least approximately Gaussian.

The lower buffer layer 1 is 12$\mu$m thick and consists of GaAlAs having a refractive index $n_2$ of 3.4376. The guiding layer 2 has a thickness T of 2$\mu$m and consists of Ga As aving a refractive index $n_1$ of 3.44. The upper buffer layer 3 is 8$\mu$m thick, again consists of GaAlAs and has a refractive index $n_4$ also of 3.4376. The rib has a width t of 14$\mu$m. To either side of the rib and above it lies air of refractive index $n_3$ equal to 1.0.

Figure 2:
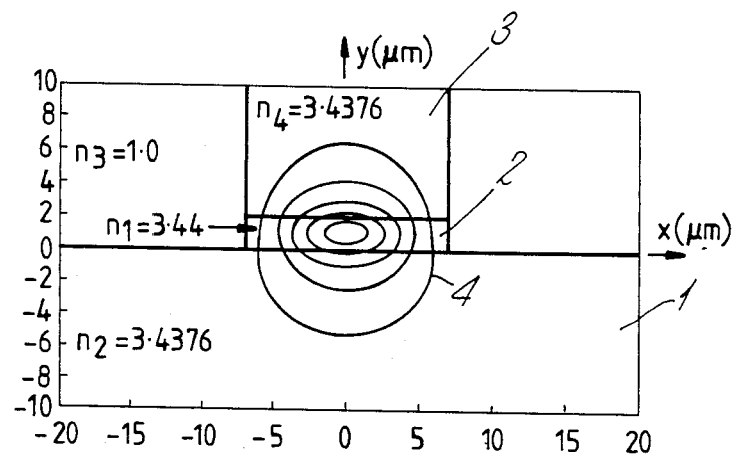
FIG. 2 shows a contour plot of an electromagnetic radiation field distribution of such a device.

Referring to FIG. 2, it has been shown that the device described above would produce a single mode beam whose electromagnetic field distribution can be represented by substantially circularly symmetric contour lines 4.

Further, it has been calculated that a device as described above would give a coupling efficiency of 87°/o (0.6 dB) when coupled to a circularly symmetric optical fibre with a spot size $W_o$ of 10μm and a Gaussian field profile.

Although the rib waveguide described with reference to FIG. 1 has a rib exposed to air at its sides and top surface, in practice the rib may be buried. In the case that the rib is buried, the refractive index of the burying material will be represented by $n_3$.

The device described above is specific in that it is designed to operate with a fibre having certain characteristics including that of producing a circular beam spot of radiation of a particular wavelength, 1.55μm. However, in practice the waveguide device may be coupled to optical waveguides having any of a range of characteristics.

Where a waveguide device is intended to couple to a waveguide having an elliptical beam spot with a horizontal axial dimension of $W_{ox}$ and a vertical axial dimension of $W_{oy}$ (whose average is $W_o$), $W_{ox}$ and $W_{oy}$ falling within the criteria:

(a) $0.5 \leq (W_{ox}W_{oy})/W_o^2 \leq 2$; and
(b) $0.7 \leq W_{ox}/W_{oy} \leq 1.5$, then using the notation:

$n_1$ = the refractive index of the primary layer,
$n_2$ = the refractive index of the lower secondary layer,
$n_3$ = the refractive index of the material to either side of the rib (in the above described embodiment this material being air)
$n_4$ = the refractive index of the upper secondary layer,
$t$ = the width of the rib,
$T$ = the thickness of the primary layer, and
$\lambda$ = the wavelength of the radiation concerned, the design of the waveguide device may vary within the following design constraints without departing from the present invention:

(i) select T according to $$2.388 \leq W_{ox}/(W_{oy}-T/2) \leq 1.194;$$

(ii) select $n_1$ and $n_2$ such that $$\lambda/2\pi \leq (n_1^2-n_2^2)^{0.5} \leq \lambda/(\pi[T(W_{oy}-T)]^{0.5});$$

(iii) select $n_3$ such that $$(n_1^2-n_3^2)^{0.5} \leq 1.55\lambda/W_{ox};$$

(iv) select $n_4$ such that $$\text{Mod}[(n_2^2-n_4^2)/(n_1^2-n_2^2)] \leq X; \text{ and}$$

$$\text{Mod}[(n_2^2-n_4^2/(n_1^2-n_2^2)] \leq Y;$$

where
$X = \tan^2(2\pi T[n_1^2-n_2^2]^{0.5}/\lambda)$; and
$Y = \tan^2([9.552T/W_{ox}]^{0.5})$; and
(v) select t such that $$1.3155W_{ox} - \lambda/\pi(n_2^2-n_3^2)^{0.5} \leq t; \text{ and}$$

$$t \leq 1.3155W_{ox} - \lambda/\pi(n_1^2-n_3^2)^{0.5};$$

the thickness of the confining layers 1, 3, being great enough that radiation from the beam propagating in the waveguide device in use does not leak beyond the confining layers 1, 3. Regarding the latter, the confining layers, 1, 3 may for instance be each at least equal to $2W_o/3$ in thickness.

It will be seen from the above that the refractive indices of the two confining layers 1, 3 do not have to be equal.

A waveguide device falling within the above design constraints provides in essence a combination of narrow optical confinement with small differences in refractive index along one axis, and broad optical confinement with larger differences in refractive index along a perpendicular axis. Surprisingly, single transverse mode propagation is achieved in spite of the broad confinement and larger differences in refractive index along the perpendicular axis.

A waveguide device according to an embodiment of the present invention could be used as an end portion of a second device, such as a phase modulator, to couple it to an optical fibre. This would be advantageous where the second device required beam parameters which conflicted with those required for good coupling with an optical fibre.

It will be realised that the electromagnetic field distribution of a device is important in the region of the port to the guiding zone rather than along the length of the device since it is at the port that coupling with another optical component occurs.

Although reference has largely been made to coupling between waveguide devices and an optical fibre, it may be that coupling may be required to a component with beam characteristics similar to those of an optical fibre, the component itself not being an optical fibre. Waveguide devices according to embodiments of the present invention will also of course be appropriate for use with such components.

We claim:

1. A single mode waveguide device, for coupling optical radiation to a single mode optical fibre, comprising a guiding zone determined in each of two perpendicular directions by a region of higher refractive index bounded on each side by regions of lower refractive index, wherein in a first of the directions the changes in refractive index are large and provide broad optical confinement, and in a second of the directions the changes in refractive index are small and provide narrow optical confinement, the regions of lower refractive index extending far enough away from the regions of higher refractive index that radiation propagating in the device in use does not leak significantly beyond the regions of lower refractive index, the arrangement being such that the beam spot of the waveguide device is at least substantially elliptical.

2. A device according to claim 1 wherein the changes in refractive index in the first direction are greater than or equal to 0.02.

3. A device according to either one of claims 1 or 2 wherein the changes in refractive index in the second direction each lie in the range 0.0001 to 0.01 inclusive.

4. A device according claim 1 wherein the changes in refractive index in the first direction are separated by a distance which lies in the range from $(0.8w_1-2\mu m)$ to $2.3w_1$ inclusive, $w_1$ being the average of the values for the width of the beam spot of the device in each of the two directions in μm.

5. A device according to claim 1 wherein the changes in refractive index in the second direction are separated by a distance which is less than or equal to $w_1$, $w_1$ being the average of the values for the width of the beam spot of the device in each of the two directions.

6. A device according to either one of claims 4 or 5 wherein $w_1$ lies in the range from 5 to 15μm inclusive.

7. A single mode waveguide device, for coupling radiation of wavelength $\lambda$ to a single mode optical waveguide having an elliptical beam spot of average dimension $W_o$ along its two axes, comprising a guiding zone and a confining zone, wherein the guiding zone is provided by first and second pairs of substantially parallel planar interfaces, the planes in which the interfaces lie defining a region of material of rectangular cross-section, the first pair of interfaces being provided by the faces of a primary layer of material of thickness T and refractive index $n_1$ sandwiched between upper and lower secondary layers of material of average refractive indices $n_2$ and $n_4$, and the second pair of interfaces being provided at least partially by the sides of a region of the upper secondary layer of width t positioned between two regions of material of refractive index $n_3$, wherein the following design constraints apply:

(i) $(n_1-n_3) \geqq 0.02$;
(ii) $(n_1-n_4)$ and $(n_1-n_2)$ each lie in the range 0.01 to 0.0001 inclusive;
(iii) $T \leqq W_o$;
(iv) t lies in the range $(0.8W_o-2\mu m)$ to $2.3W_o$ inclusive; and
(v) the thickness of the secondary layers is such that radiation propagating in the device in use does not leak beyond them;

all measurements being made in $\mu m$.

8. A device according to claim 7 wherein the second pair of interfaces is partially provided by the sides of a region of the primary layer of width t positioned between two regions of the material of refractive index $n_3$.

9. A single mode optical waveguide of rectangular cross-section which is nevertheless especially suited for coupling optical radiation propagating therewithin to a single mode optical fibre having a generally circular distribution of radiation fields propagating therewithin, said waveguide comprising:

an optical radiation guide having an index of refraction $n_1$ and being of rectangular cross section with a thickness t and width w where $t < w$;
an upper buffer layer having an index of refraction $n_4$ where $n_4 < n_1$;
a lower buffer layer having an index of refraction $n_2$ where $n_2 < n_1$;
said upper and lower buffer layers being disposed along width w of respective opposite upper and lower sides of the guide so as to sandwich the guide therebetween and thereby provide narrow optical confinement across thickness t of the guide; and
a pair of side regions having an index of refraction $n_3$, where $n_3 << n_1$, said side regions bounding respective opposite lateral sides of said guide so as to sandwich the guide therebetween and to thereby provide broad optical confinement across the width w of the guide;
whereby radiation fields propagating along said waveguide are caused to have a generally circular distribution generally matching that expected in a single mode optical fibre.

* * * * *

UNITED STATES PATENT AND TRADEMARK OFFICE
CERTIFICATE OF CORRECTION

PATENT NO. : 4,776,655

DATED : 11 October 1988

INVENTOR(S) : ROBERTSON et al

It is certified that error appears in the above-identified patent and that said Letters Patent is hereby corrected as shown below:

On the cover page, item [73], change
"British Telecommunications" to
--British Telecommunications public limited company--;

Item [56], line 8 thereof;
change "924994" to --1924994--.

Column 4, line 19, delete "erea";
line 56, change "aving" to --having--;
line 67, change "$^\circ/_o$ to --$o/_o$--.

Column 5, line 20, change "$W^2{}_o$" to --$W_o{}^2$--;
lines 39, 43 and 47, change "$\leq$" to --$\geq$--; and
lines 43, 47, 50, 52, 55, 59 and 61, the superscripts
to "n" should occur after the associated subscript
(e.g. "$n^2{}_1$" should be "$n_1{}^2$").

Signed and Sealed this

Fifteenth Day of May, 1990

*Attest:*

HARRY F. MANBECK, JR.

*Attesting Officer*      *Commissioner of Patents and Trademarks*